US010534857B2

(12) United States Patent
Xu

(10) Patent No.: US 10,534,857 B2
(45) **Date of Patent: *Jan. 14, 2020**

(54) SYSTEM AND METHOD IN A SOCIAL NETWORKING SYSTEM FOR DISPLAYING UPDATES IN AN INFORMATION FEED

(71) Applicant: salesforce.com, inc., San Francisco, CA (US)

(72) Inventor: Zhenhua Xu, Stockholm (SE)

(73) Assignee: salesforce.com, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/175,518

(22) Filed: Oct. 30, 2018

(65) Prior Publication Data

US 2019/0065448 A1 Feb. 28, 2019

Related U.S. Application Data

(63) Continuation of application No. 15/453,478, filed on Mar. 8, 2017, now Pat. No. 10,169,312.

(51) Int. Cl.

| | |
|---|---|
| ***G06F 3/048*** | (2013.01) |
| ***G06F 17/00*** | (2019.01) |
| ***G06F 17/22*** | (2006.01) |
| ***H04L 29/08*** | (2006.01) |
| ***G06F 16/951*** | (2019.01) |
| ***G06Q 50/00*** | (2012.01) |
| ***G06F 16/2457*** | (2019.01) |

(52) U.S. Cl.

CPC .... *G06F 17/2288* (2013.01); *G06F 16/24578* (2019.01); *G06F 16/951* (2019.01); *G06F 17/227* (2013.01); *G06F 17/2247* (2013.01); *G06Q 50/01* (2013.01); *H04L 67/02* (2013.01)

(58) Field of Classification Search

CPC ............................ G06Q 50/01; G06F 17/2247
USPC ................................. 715/236, 200, 234, 768
See application file for complete search history.

(56) References Cited

U.S. PATENT DOCUMENTS

2005/0267973 A1* 12/2005 Carlson .................. G06Q 30/06 709/228
2011/0154223 A1* 6/2011 Whitnah ................ G06Q 10/10 715/753

(Continued)

*Primary Examiner* — Manglesh M Patel
(74) *Attorney, Agent, or Firm* — LKGlobal | Lorenz & Kopf, LLP

(57) ABSTRACT

A method of providing feed information is provided. The method comprises calculating an affinity score for each information source that provides updates to an information feed for a first user of a social networking system wherein the affinity score for each information source is calculated based on interaction factors between the first user and the information source. The method further comprises assigning a transparency value to each information source by converting the affinity score to a transparency value, generating the information feed of the social networking system for the first user wherein the information feed includes updates from the information sources, sending the information feed and the transparency value for each information source to a web browser operated by the first user, and instructing the web browser to display each update at a transparency level that corresponds to the transparency value assigned to the information source that provided the update.

20 Claims, 14 Drawing Sheets

1200

1202 Calculate an affinity score for each information source providing feed items for an information feed 1204 Assign a transparency value to each information source based on the information source's affinity score 1206 Assign a transparency value to each feed item based on (or equal to) the information source's transparency value 1208 Generate an information feed of the social networking system, the information feed including feed items from the information sources 1210 Send the information feed and the transparency value for each information source to a web browser operated by the first user 1212 Instruct the web browser to display each update at a transparency level that corresponds to the transparency value assigned to the information source that provided the update

(56) References Cited

U.S. PATENT DOCUMENTS

| | | | | |
|---|---|---|---|---|
| 2014/0013228 | A1* | 1/2014 | Hutten .................... | G06F 3/048 715/720 |
| 2015/0161970 | A1* | 6/2015 | Sunkara .................. | G09G 5/38 345/634 |

* cited by examiner

SYSTEM AND METHOD IN A SOCIAL NETWORKING SYSTEM FOR DISPLAYING UPDATES IN AN INFORMATION FEED

CROSS-REFERENCE TO RELATED APPLICATION

This application claims the benefit as a continuation of U.S. patent application Ser. No. 15/453,478, having the same title as this application, and filed on Mar. 8, 2017. This application incorporates the prior application into the present application by reference.

TECHNICAL FIELD

Embodiments of the subject matter described herein relate generally to computer systems and social networking systems, and more particularly to techniques for customizing information feeds from social networking systems.

BACKGROUND

Enterprise social networking systems provide users with an information feed of feed items such as posts for tracked objects. Social networking system users can track project and sales opportunities, solicit input from knowledgeable colleagues, and otherwise enrich the social networking experience through updates about coworkers, customers, topics of interest, and business objects, sometimes referred to as "feed tracked changes." Users can also form groups and post messages on each other's profiles to facilitate collaboration and seek help from the community.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

Figure 1:
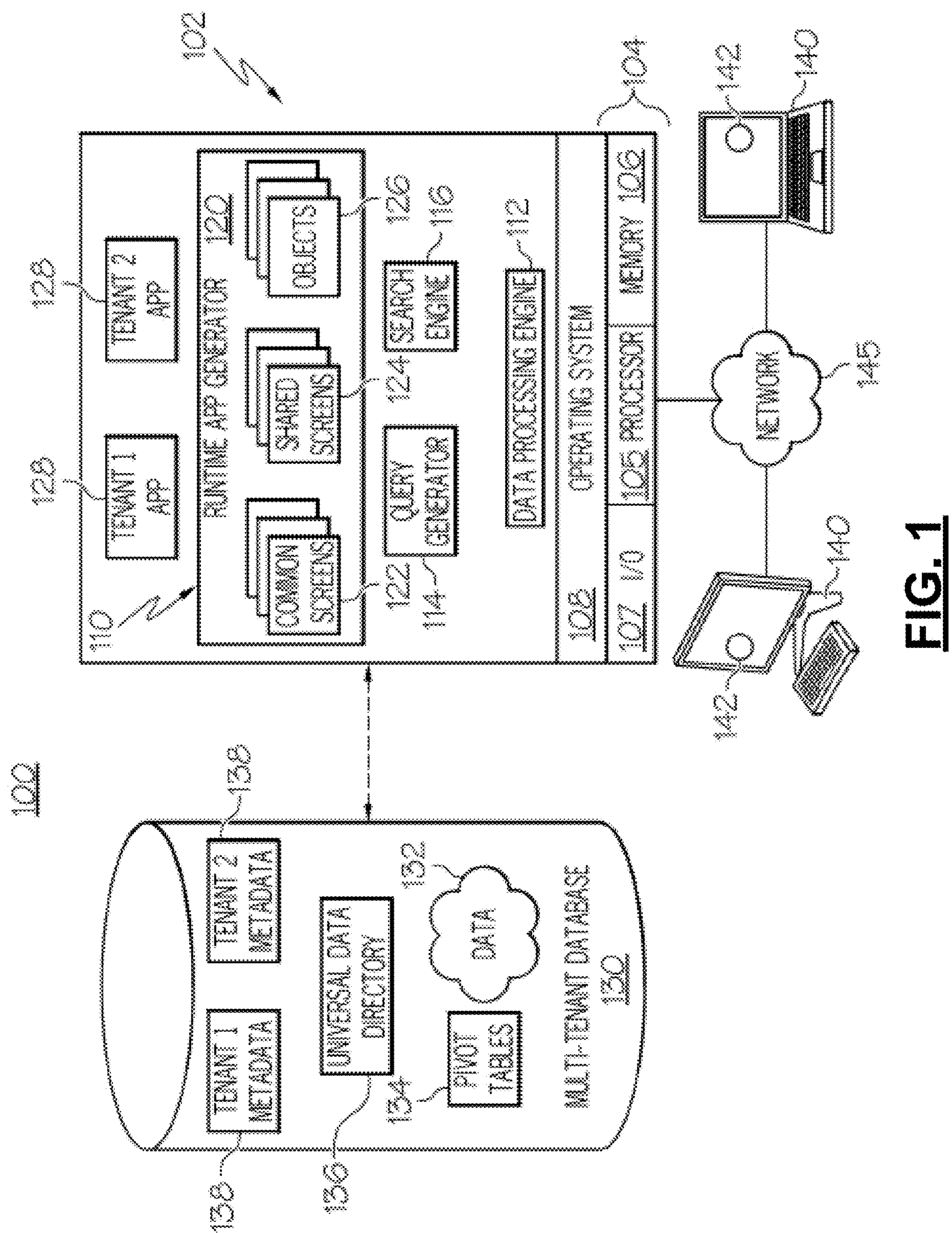
FIG. 1 is a block diagram of an example computing environment.

Social networking systems can be used to facilitate communication among social networking system users who may be individual people and/or groups of people. Social network systems may be implemented for various organizations such as business entities, business partnerships, academic institutions, groups or departments within an organization, and others. Social networking systems can provide users with access to one or more information feeds that include information updates presented as feed items or entries in the feed. A feed item may include a single information update or a collection of individual information updates. A feed item can include various types of data including character-based data, audio data, image data and/or video data. An information feed can be displayed in a graphical user interface (GUI) on a display device such as the display of a computing device. The information updates can include various social network data from various sources and can be stored in an on-demand database service environment. Feed items can be stored and maintained in one or more database tables, e.g., as rows in the table(s), that can be accessed to retrieve relevant information to be presented as part of a displayed information feed. A social networking system may be implemented in a multi-tenant database environment, although such an environment is not required in all embodiments.

A social networking system may allow a user to follow data objects in the form of records such as cases, accounts, or opportunities, in addition to following individual users and groups of users. The "following" of a record stored in a database allows a user to track the progress of that record. Updates to the record, also referred to herein as changes to the record, are one type of information update that can occur and be noted on an information feed such as a record feed or a news feed of a user subscribed to the record. Examples of record updates include field changes in the record, updates to the status of a record, as well as the creation of the record itself. Some records are publicly accessible, such that any user can follow the record, while other records are private, for which appropriate security clearance/permissions are a prerequisite to a user following the record.

Information updates can include various types of updates, which may or may not be linked with a particular record. For example, information updates can be user-submitted messages or can otherwise be generated in response to user actions or in response to events. Examples of messages include: posts, comments, indications of a user's personal preferences such as "likes" and "dislikes", updates to a user's status, uploaded files, and hyperlinks to social network data or other network data such as various documents and/or web pages on the Internet. Posts can include alphanumeric or other character-based user inputs such as words, phrases, statements, questions, emotional expressions, and/or symbols. Comments generally refer to responses to posts, such as words, phrases, statements, answers, questions, and reactionary emotional expressions and/or symbols. Multimedia data can be included in, linked with, or attached to a post or comment. For example, a post can include textual statements in combination with a JPEG image or animated image. A like or dislike can be submitted in response to a particular post or comment. Examples of uploaded files include presentations, documents, multimedia files, and the like.

Users can follow a record by subscribing to the record, as mentioned above. Users can also follow other entities such as other types of data objects, other users, and groups of users. Feed tracked updates regarding such entities are one type of information update that can be received and included in the user's information feed. Any number of users can follow a particular entity and thus view information updates pertaining to that entity on the users' respective information feeds. In some social networking systems, users may follow each other by establishing connections with each other, sometimes referred to as "friending" one another. By establishing such a connection, one user may be able to see information generated by, generated about, or otherwise associated with another user. For instance, a first user may be able to see information posted by a second user to the second user's personal social network page. One implementation of such a personal social network page is a user's profile page, for example, in the form of a web page representing the user's profile. In one example, when the first user is following the second user, the first user's information feed can receive a post from the second user submitted to the second user's profile feed, also referred to herein as the user's "wall," which is one example of an information feed displayed on the user's profile page.

An information feed may be specific to a group of users of an online social network. For instance, a group of users may publish an information feed. Members of the group may view and post to the group feed in accordance with a permissions configuration for the information feed and the group. Information updates in a group context can also include changes to group status information.

With the increased use of online social networking systems, a user's information feed may include a large number of feed items, such as posts, comments, likes and dislikes, etc., potentially making it time consuming for a user to keep up with all feed items. Many of the feed items may be relevant to the user but many of the feed items may not be relevant. As a result, a user accessing the information feed may have to spend a great deal of time, energy, and effort to read through numerous feed items, identify feed items of interest, consume the content of selected information in the feed, and synthesize the information to mentally piece together a larger conversation defined by the relevant posts, comments, likes/dislikes, etc.

Disclosed herein are systems and methods for customizing the information feed to focus the information feed to feed items that may be more relevant to the user. The subject matter described herein discloses apparatus, systems, techniques and articles for displaying feed items from a user's information feed in a user interface at different transparency levels to allow certain feeds to be more pronounced.

Turning now to FIG. 1, an exemplary social networking system may be implemented in the context of an example multi-tenant system 100. The example multi-tenant system 100 of FIG. 1 includes a server 102 that dynamically creates and supports virtual applications 128 based upon data 132 from a common database 130 that is shared between multiple tenants, alternatively referred to herein as a multi-tenant database. Data and services generated by the virtual applications 128 are provided via a network 145 to any number of client devices 140, as desired. Each virtual application 128 is suitably generated at run-time (or on-demand) using a common application platform 110 that securely provides access to the data 132 in the database 130 for each of the various tenants subscribing to the multi-tenant system 100.

As used herein, a "tenant" or an "organization" should be understood as referring to a group of one or more users or entities that shares access to common subset of the data within the multi-tenant database 130. In this regard, each tenant includes one or more users associated with, assigned to, or otherwise belonging to that respective tenant. To put it another way, each respective user within the multi-tenant system 100 is associated with, assigned to, or otherwise belongs to a particular tenant of the plurality of tenants supported by the multi-tenant system 100. Tenants may represent customers, customer departments, business or legal organizations, and/or any other entities that maintain data for particular sets of users within the multi-tenant system 100 (i.e., in the multi-tenant database 130). For example, the application server 102 may be associated with one or more tenants supported by the multi-tenant system 100. Although multiple tenants may share access to the server 102 and the database 130, the particular data and services provided from the server 102 to each tenant can be securely isolated from those provided to other tenants (e.g., by restricting other tenants from accessing a particular tenant's data using that tenant's unique organization identifier as a filtering criterion). The multi-tenant architecture therefore allows different sets of users to share functionality and hardware resources without necessarily sharing any of the data 132 belonging to or otherwise associated with other tenants.

The multi-tenant database 130 is any sort of repository or other data storage system capable of storing and managing the data 132 associated with any number of tenants. The database 130 may be implemented using any type of conventional database server hardware. In various embodiments, the database 130 shares processing hardware 104 with the server 102. In other embodiments, the database 130 is implemented using separate physical and/or virtual database server hardware that communicates with the server 102 to perform the various functions described herein. In an exemplary embodiment, the database 130 includes a database management system or other equivalent software capable of determining an optimal query plan for retrieving and providing a particular subset of the data 132 to an instance of virtual application 128 in response to a query initiated or otherwise provided by a virtual application 128. The multi-tenant database 130 may alternatively be referred to herein as an on-demand database, in that the multi-tenant database 130 provides (or is available to provide) data at run-time to on-demand virtual applications 128 generated by the application platform 110.

In practice, the data 132 may be organized and formatted in any manner to support the application platform 110. In various embodiments, the data 132 is suitably organized into a relatively small number of large data tables to maintain a semi-amorphous "heap"-type format. The data 132 can then be organized as needed for a particular virtual application 128. In various embodiments, conventional data relationships are established using any number of pivot tables 134 that establish indexing, uniqueness, relationships between entities, and/or other aspects of conventional database organization as desired. Further data manipulation and report formatting is generally performed at run-time using a variety of metadata constructs. Metadata within a universal data directory (UDD) 136, for example, can be used to describe any number of forms, reports, workflows, user access privileges, business logic and other constructs that are common to multiple tenants. Tenant-specific formatting, functions and other constructs may be maintained as tenant-specific metadata 138 for each tenant, as desired. Rather than forcing the data 132 into an inflexible global structure that is common to all tenants and applications, the database 130 is organized to be relatively amorphous, with the pivot tables 134 and the metadata 138 providing additional structure on an as-needed basis. To that end, the application platform 110 suitably uses the pivot tables 134 and/or the metadata 138 to generate "virtual" components of the virtual applications 128 to logically obtain, process, and present the relatively amorphous data 132 from the database 130.

The server 102 is implemented using one or more actual and/or virtual computing systems that collectively provide the dynamic application platform 110 for generating the virtual applications 128. For example, the server 102 may be implemented using a cluster of actual and/or virtual servers operating in conjunction with each other, typically in association with conventional network communications, cluster management, load balancing and other features as appropriate. The server 102 operates with any sort of conventional processing hardware 104, such as a processor 105, memory 106, input/output features 107 and the like. The input/output features 107 generally represent the interface(s) to networks (e.g., to the network 145, or any other local area, wide area or other network), mass storage, display devices, data entry devices and/or the like. The processor 105 may be implemented using any suitable processing system, such as one or more processors, controllers, microprocessors, microcontrollers, processing cores and/or other computing resources spread across any number of distributed or integrated systems, including any number of "cloud-based" or other virtual systems. The memory 106 represents any non-transitory short or long term storage or other computer-readable media capable of storing programming instructions for execution on the processor 105, including any sort of random access memory (RAM), read only memory (ROM), flash memory, magnetic or optical mass storage, and/or the like. The computer-executable programming instructions, when read and executed by the server 102 and/or processor 105, cause the server 102 and/or processor 105 to create, generate, or otherwise facilitate the application platform 110 and/or virtual applications 128 and perform one or more additional tasks, operations, functions, and/or processes described herein. It should be noted that the memory 106 represents one suitable implementation of such computer-readable media, and alternatively or additionally, the server 102 could receive and cooperate with external computer-readable media that is realized as a portable or mobile component or application platform, e.g., a portable hard drive, a USB flash drive, an optical disc, or the like.

The application platform 110 is any sort of software application or other data processing engine that generates the virtual applications 128 that provide data and/or services to the client devices 140. In a typical embodiment, the application platform 110 gains access to processing resources, communications interfaces and other features of the processing hardware 104 using any sort of conventional or proprietary operating system 108. The virtual applications 128 are typically generated at run-time in response to input received from the client devices 140. For the illustrated embodiment, the application platform 110 includes a bulk data processing engine 112, a query generator 114, a search engine 116 that provides text indexing and other search functionality, and a runtime application generator 120. Each of these features may be implemented as a separate process or other module, and many equivalent embodiments could include different and/or additional features, components or other modules as desired.

The runtime application generator 120 dynamically builds and executes the virtual applications 128 in response to specific requests received from the client devices 140. The virtual applications 128 are typically constructed in accordance with the tenant-specific metadata 138, which describes the particular tables, reports, interfaces and/or other features of the particular application 128. In various embodiments, each virtual application 128 generates dynamic web content that can be served to a browser or other client program 142 associated with its client device 140, as appropriate.

The runtime application generator 120 suitably interacts with the query generator 114 to efficiently obtain multi-tenant data 132 from the database 130 as needed in response to input queries initiated or otherwise provided by users of the client devices 140. In a typical embodiment, the query generator 114 considers the identity of the user requesting a particular function (along with the user's associated tenant), and then builds and executes queries to the database 130 using system-wide metadata 136, tenant specific metadata 138, pivot tables 134, and/or any other available resources. The query generator 114 in this example therefore maintains security of the common database 130 by ensuring that queries are consistent with access privileges granted to the user and/or tenant that initiated the request. In this manner, the query generator 114 suitably obtains requested subsets of data 132 accessible to a user and/or tenant from the database 130 as needed to populate the tables, reports or other features of the particular virtual application 128 for that user and/or tenant.

Still referring to FIG. 1, the data processing engine 112 performs bulk processing operations on the data 132 such as uploads or downloads, updates, online transaction processing, and/or the like. In many embodiments, less urgent bulk processing of the data 132 can be scheduled to occur as processing resources become available, thereby giving priority to more urgent data processing by the query generator 114, the search engine 116, the virtual applications 128, etc.

In exemplary embodiments, the application platform 110 is utilized to create and/or generate data-driven virtual applications 128 for the tenants that they support. Such virtual applications 128 may make use of interface features such as custom (or tenant-specific) screens 124, standard (or universal) screens 122 or the like. Any number of custom and/or standard objects 126 may also be available for integration into tenant-developed virtual applications 128. As used herein, "custom" should be understood as meaning that a respective object or application is tenant-specific (e.g., only available to users associated with a particular tenant in the multi-tenant system) or user-specific (e.g., only available to a particular subset of users within the multi-tenant system), whereas "standard" or "universal" applications or objects are available across multiple tenants in the multi-tenant system. For example, a virtual CRM application may utilize standard objects 126 such as "account" objects, "opportunity" objects, "contact" objects, or the like. The data 132 associated with each virtual application 128 is provided to the database 130, as appropriate, and stored until it is requested or is otherwise needed, along with the metadata 138 that describes the particular features (e.g., reports, tables, functions, objects, fields, formulas, code, etc.) of that particular virtual application 128. For example, a virtual application 128 may include a number of objects 126 accessible to a tenant, wherein for each object 126 accessible to the tenant, information pertaining to its object type along with values for various fields associated with that respective object type are maintained as metadata 138 in the database 130. In this regard, the object type defines the structure (e.g., the formatting, functions and other constructs) of each respective object 126 and the various fields associated therewith.

Still referring to FIG. 1, the data and services provided by the server 102 can be retrieved using any sort of personal computer, mobile telephone, tablet or other network-enabled client device 140 on the network 145. In an exemplary embodiment, the client device 140 includes a display device, such as a monitor, screen, or another conventional electronic display capable of graphically presenting data and/or information retrieved from the multi-tenant database 130. Typically, the user operates a conventional browser application or other client program 142 executed by the client device 140 to contact the server 102 via the network 145 using a networking protocol, such as the hypertext transport protocol (HTTP) or the like. The user typically authenticates his or her identity to the server 102 to obtain a session identifier ("SessionID") that identifies the user in subsequent communications with the server 102. When the identified user requests access to a virtual application 128, the runtime application generator 120 suitably creates the application at run time based upon the metadata 138, as appropriate. As noted above, the virtual application 128 may contain Java, ActiveX, or other content that can be presented using conventional client software running on the client device 140; other embodiments may simply provide dynamic web or other content that can be presented and viewed by the user, as desired. In various embodiments, application 128 embodies the functionality of a collaboration solution such as a social networking system.

Figure 2:
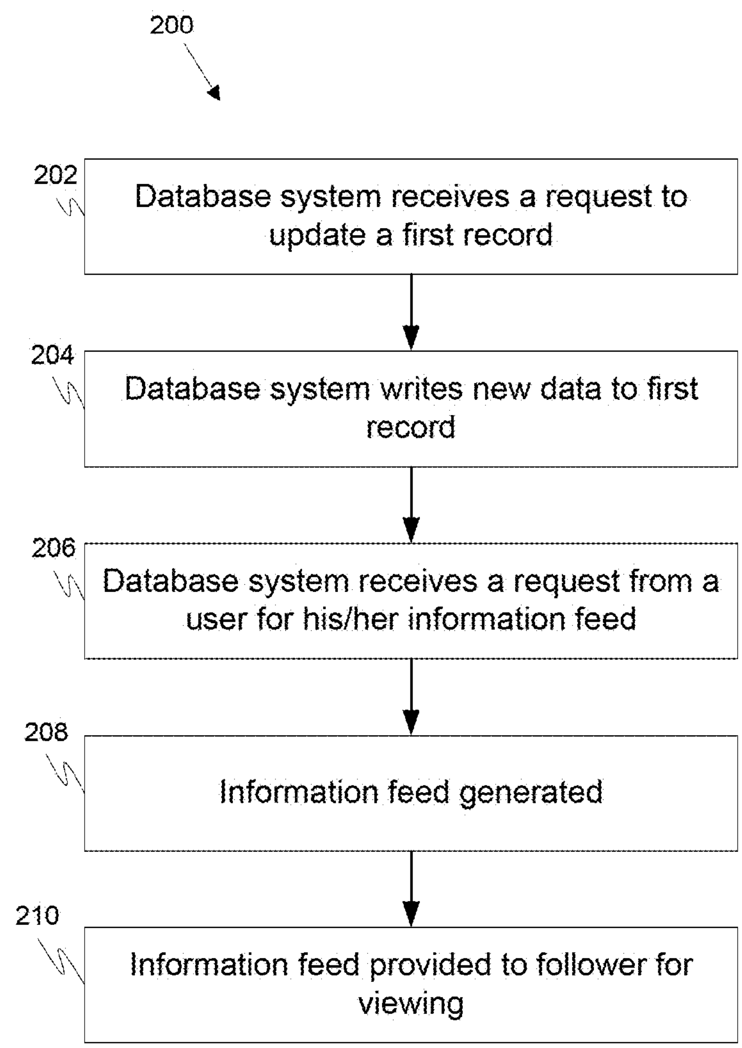
FIG. 2 is a process flow chart depicting an example process for generating and displaying an information feed.

FIG. 2 is a process flow chart depicting an example process 200 for tracking updates to a record stored in a social networking system. This example process 200 (and other processes described herein) may be implemented at least partially with a multi-tenant database system, e.g., by one or more processors configured to receive or retrieve information, process the information, store results, and transmit the results. This example process 200 may also be implemented at least partially with a single tenant database system.

At operation 202, the database system receives a request to update a first record. The request may be received from a user. For example, a user may access, change and save a page associated with the first record. The database system may also automatically create the request to update the first record. For instance, the database system can create the request in response to another event, e.g., a request to change a field could be sent periodically at a particular date and/or time of day, or a change to another field or object. The database system can obtain a new value based on other fields of a record and/or based on parameters in the system.

The request for the update of a field of a record is an example of an event associated with the first record for which a feed tracked update may be created. The database system can also identify other events besides updates to fields of a record for which a feed tracked update may be created. For example, an event can be a submission of approval to change a field. Such an event can also have an associated field (e.g., a field showing a status of whether a change has been submitted). Other examples of events can include creation of a record, deletion of a record, converting a record from one type to another (e.g., converting a lead to an opportunity), closing a record (e.g., a case type record), and potentially any other state change of a record—any of which could include a field change associated with the state change. Any of these events update the record whether by changing a field of the record, a state of the record, or some other characteristic or property of the record. In one implementation, a list of supported events for creating a feed tracked update can be maintained within the database system, e.g., at a server or in a database.

In response to the request to update a first record, the database system writes new data to the first record (operation 204). The new data may include a new value that replaces old data. For example, a field may be updated with a new value. The new data may also be a value for a field that did not contain data before. Also, the new data could be a flag, e.g., for a status of the record, which can be stored as a field of the record.

A user of the social networking system may be a follower a number of records including the first record. The user may access the social networking system and request access to his/her information feed (operation 206). The social networking system generates an information feed for the user based on updates to the records the user is following (operation 208). Although the example process 200 shows the information feed being generated after the user requests access to the information feed, in other examples, the information feed may be generated, updated and stored contemporaneously with feed items becoming available for the information feed. In these examples, instead of generating an information feed in response to a user's request for the information, i.e., generating an information feed on the fly, the previously generated and stored information feed is retrieved. Finally, the information feed is provided to the user for viewing (operation 210) in a user interface such as a graphical user interface provided by browser displaying a web page.

Figure 3:
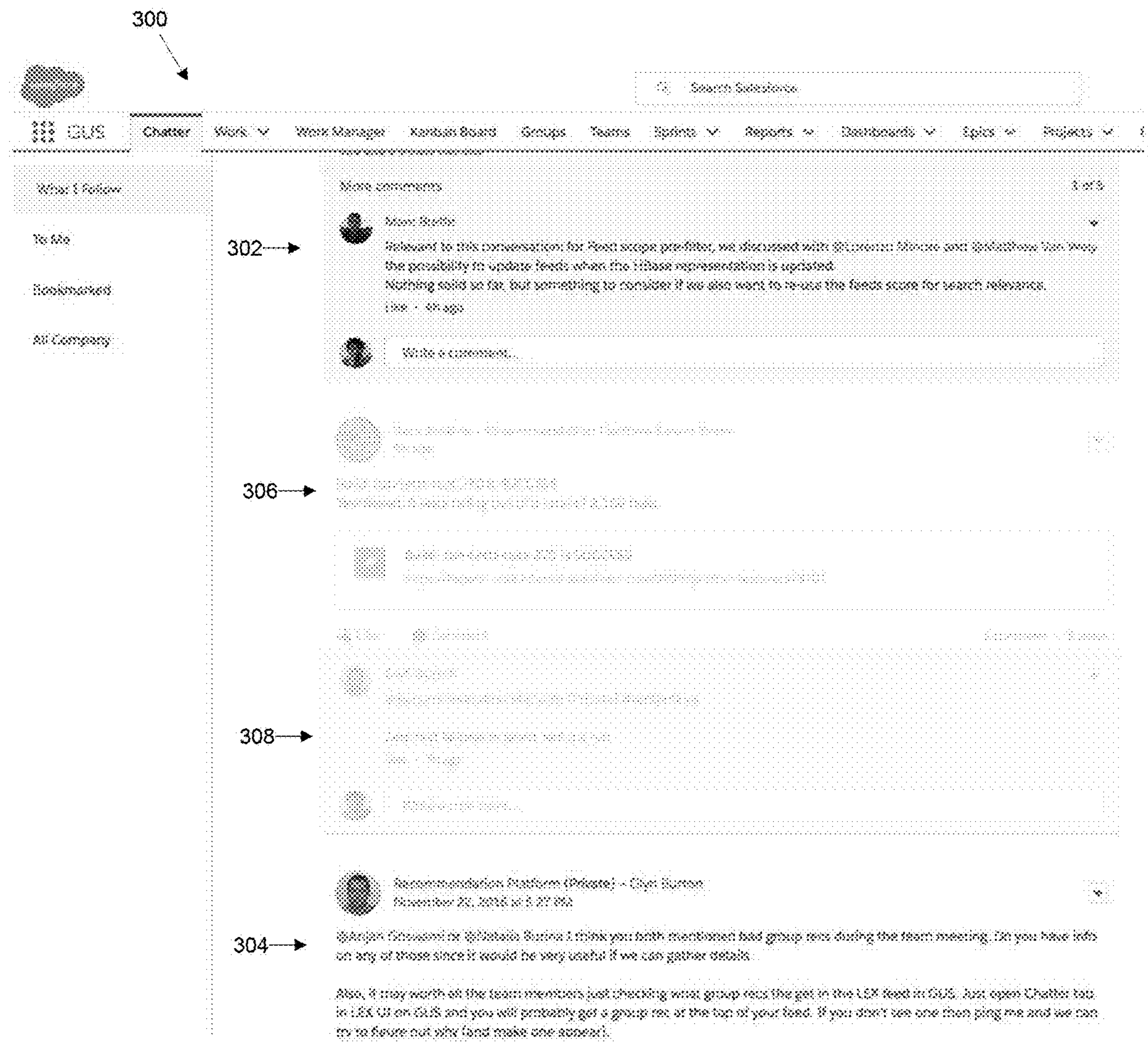
FIG. 3 is a screenshot of a graphical user interface displaying an example information feed depicting feed items displayed at different transparency levels.

FIG. 3 is a screenshot of a graphical user interface displaying an example information feed 300 depicting feed items displayed at different transparency levels. The example information feed 300 includes four feed items 302, 304, 306, 308. Two feed items 302, 304 are displayed at a low transparency/high opacity level. The other two feed items 306, 308 are displayed at a higher transparency/lower opacity level. The example information feed, with the feed items displayed at different transparency/opacity levels, allows a user to focus on the feed items 302, 304 that are displayed at the lower transparency/higher opacity level. The transparency/opacity levels are set based on affinity scores applied to the information sources from which the feed items were derived. The feed items from information sources with a higher affinity score received a lower transparency/higher opacity level. The feed items from information sources with a lower affinity score received a higher transparency/lower opacity level. The affinity scores may provide an indication as to which feed items may be more relevant to a user. The higher the affinity score, the more relevant the feed item may be to a user. The affinity scores in this example are calculated based on the number, type, frequency, and recentness of interactions between the user and the information source.

Figure 4:
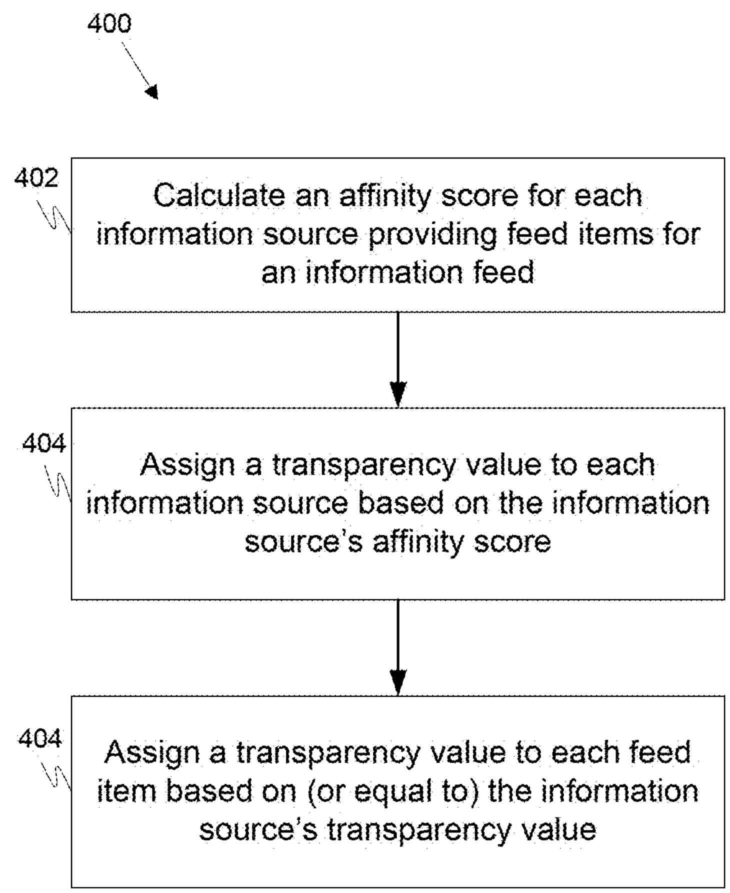
FIG. 4 is a process flow chart depicting an example process for assigning different transparency values to feed items.

FIG. 4 is a process flow chart depicting an example process 400 for assigning different transparency values to feed items. In this example, the social networking system calculates an affinity score for a number of information sources including the information sources that will provide feed items for a user's information feed (operation 402). The affinity scores provide an indication as to which feed items may be more relevant to a user. The higher the affinity score, the more relevant a feed item may be to a user. The affinity scores in this example are calculated based on the number, type, frequency and recentness of interactions between the user and the information source.

The social networking system assigns a transparency value to each information source based on the information source's affinity score (operation 404). The transparency value may have a range between 0 and 100 to correspond with a range of 0% transparency to 100% transparency. A higher affinity score results in a lower transparency value and a lower affinity score results in a higher transparency value.

The social networking system assigns a transparency value to each feed item based on (or equal to) the information source's transparency value (operation 406). In some examples, the feed item's transparency value is equal to its source's transparency value but it does not have to be. As an example, the source's transparency value may be a continuous value that is inversely proportional to the source's affinity score and the feed item's transparency value may be a discrete value assigned based on the range of values within which the source's transparency value falls.

Figure 5:
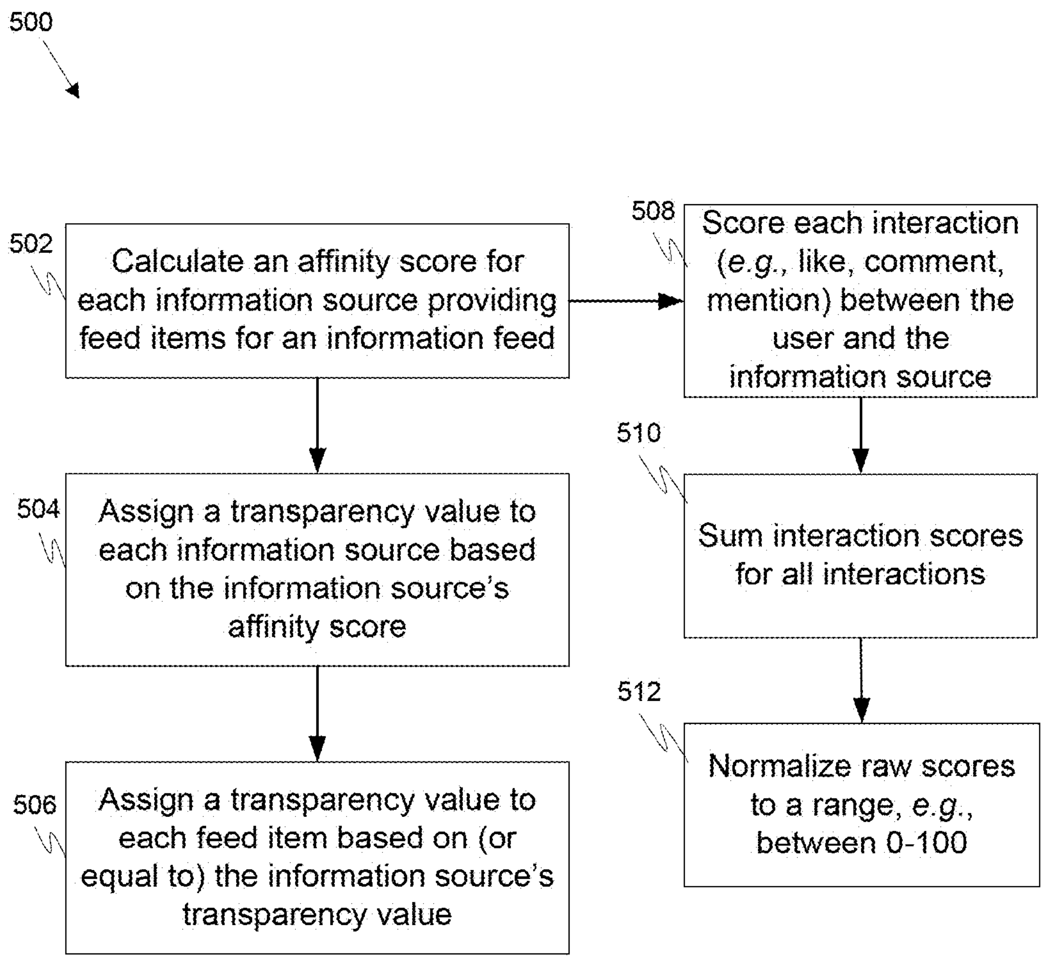
FIG. 5 is a process flow chart depicting another example process for assigning different transparency values to feed items.

FIG. 5 is a process flow chart depicting another example process 500 for assigning different transparency values to feed items. This example includes operations similar to the operations of example process 400. The social networking system calculates an affinity score for a number of information sources including the information sources that will provide feed items for a user's information feed (operation 502). The social networking system assigns a transparency value to each information source based on the information source's affinity score (operation 504). The social networking system assigns a transparency value to each feed item based on (or equal to) the information source's transparency value (operation 506).

This example process 500 provides example operations for calculating an affinity score. Each interaction between the user and the information source, such as a like, comment, mention, or others, is scored (operation 508). For each information source, the source's interaction scores are summed (operation 510). The raw scores from summing the interaction scores are normalized (operation 512). As an example, the scores may be normalized to a range between 0 and 100.

Figure 6:
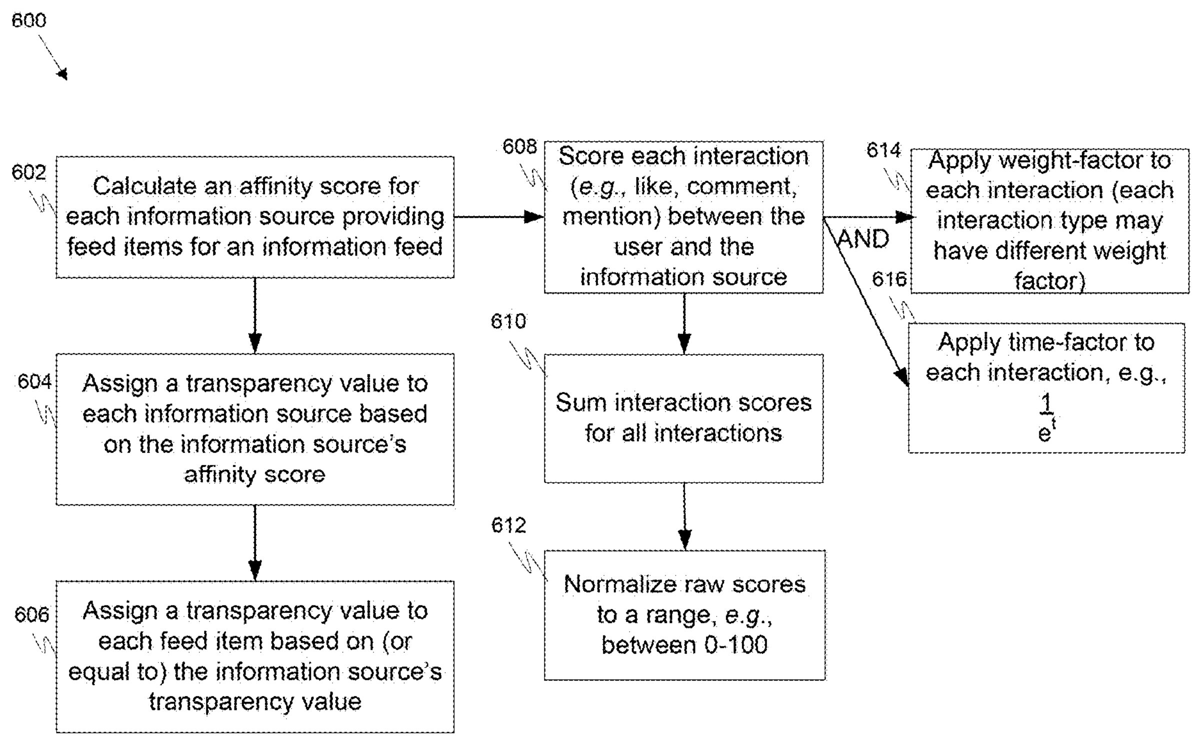
FIG. 6 is a process flow chart depicting another example process for assigning different transparency values to feed items.

FIG. 6 is a process flow chart depicting another example process 600 for assigning different transparency values to feed items. This example includes operations similar to the operations of example process 500. The social networking system calculates an affinity score for a number of information sources including the information sources that will provide feed items for a user's information feed (operation 602). The social networking system assigns a transparency value to each information source based on the information source's affinity score (operation 604). The social networking system assigns a transparency value to each feed item based on (or equal to) the information source's transparency value (operation 606). Each interaction between the user and the information source, such as a like, comment, mention, or others, is scored (operation 608). For each information source, the source's interaction scores are summed (operation 610). The raw scores from summing the interaction scores are normalized (operation 612). As an example, the scores may be normalized to a range between 0 and 100.

This example process 600 provides example operations for scoring each interaction. In this example, a weight-factor is applied to each interaction wherein each interaction type may have a different weight factor (operation 614). As an example, a comment may have a weight-factor of 2 and a mention may have a weight factor of 1.

Additionally, in this example, a time factor is applied to each interaction (operation 616). As an example, the time factor may be exponential factor such as $1/e^t$ where t is the elapsed time in hours since the interaction.

Figure 7:
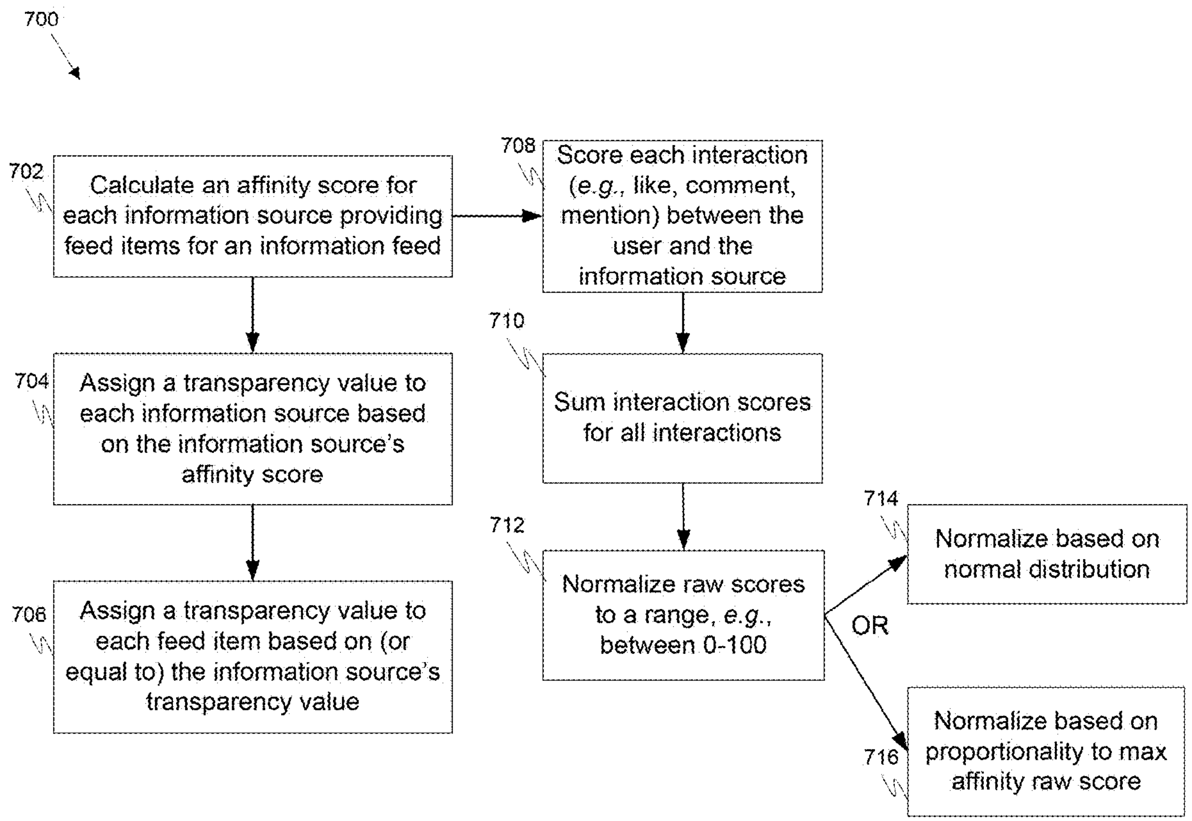
FIG. 7 is a process flow chart depicting another example process for assigning different transparency values to feed items.

FIG. 7 is a process flow chart depicting another example process 700 for assigning different transparency values to feed items. This example includes operations similar to the operations of example process 500. The social networking system calculates an affinity score for a number of information sources including the information sources that will provide feed items for a user's information feed (operation 702). The social networking system assigns a transparency value to each information source based on the information source's affinity score (operation 704). The social networking system assigns a transparency value to each feed item based on (or equal to) the information source's transparency value (operation 706). Each interaction between the user and the information source, such as a like, comment, mention, or others, is scored (operation 708). For each information source, the source's interaction scores are summed (operation 710). The raw scores from summing the interaction scores are normalized. (operation 712). As an example, the scores may be normalized to a range between 0 and 100.

This example process 700 provides example operations for normalizing raw affinity scores. In one example, the raw scores are normalized based on a normal distribution of scores (operation 714). In another example, the raw scores are normalized based on an individual raw score's proportionality to the maximum raw affinity score of all the information sources.

Figure 8:
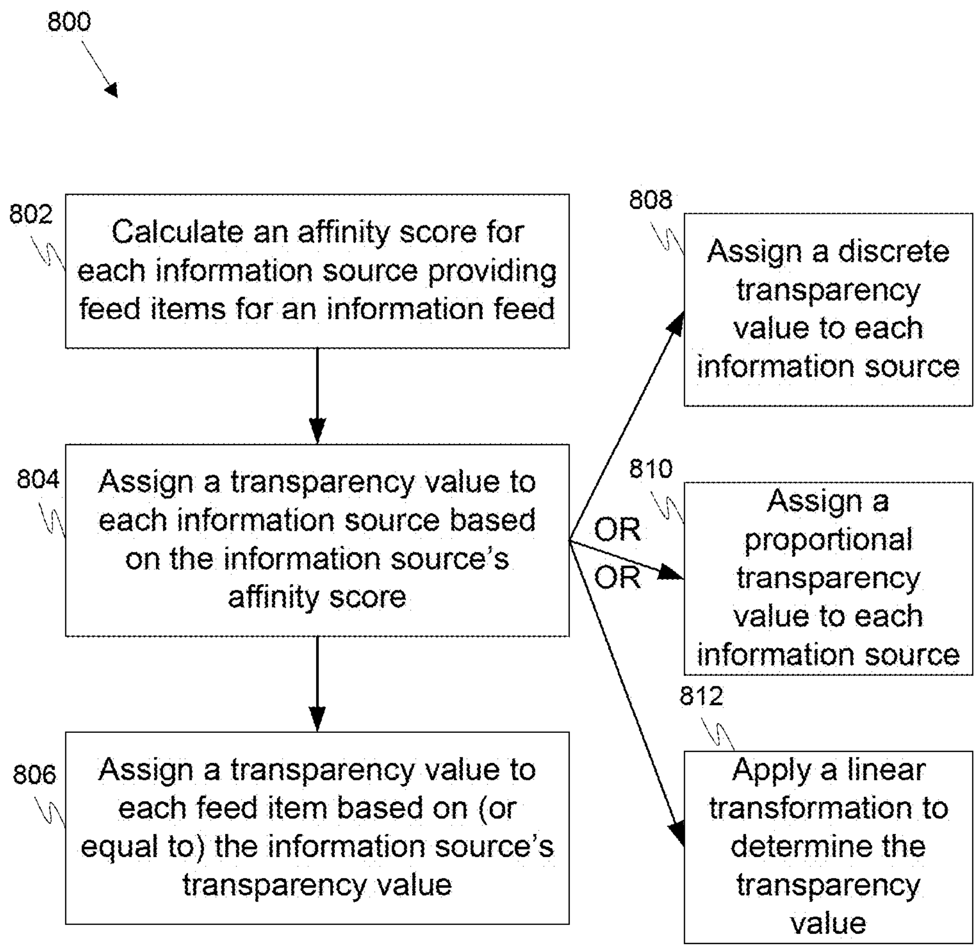
FIG. 8 is a process flow chart depicting another example process for assigning different transparency values to feed items.

FIG. 8 is a process flow chart depicting another example process 800 for assigning different transparency values to feed items. This example includes operations similar to the operations of example process 400. The social networking system calculates an affinity score for a number of information sources including the information sources that will provide feed items for a user's information feed (operation 802). The social networking system assigns a transparency value to each information source based on the information source's affinity score (operation 804). The social networking system assigns a transparency value to each feed item based on (or equal to) the information source's transparency value (operation 806).

This example process 800 provides alternative example operations for assigning a transparency value to each information source based on the information source's affinity score. In one example, a discrete transparency value is assigned (operation 808). In another example, a proportional transparency value is assigned (operation 810). In another example, a linear transformation is applied to determine the transparency value (operation 812).

Figure 9:
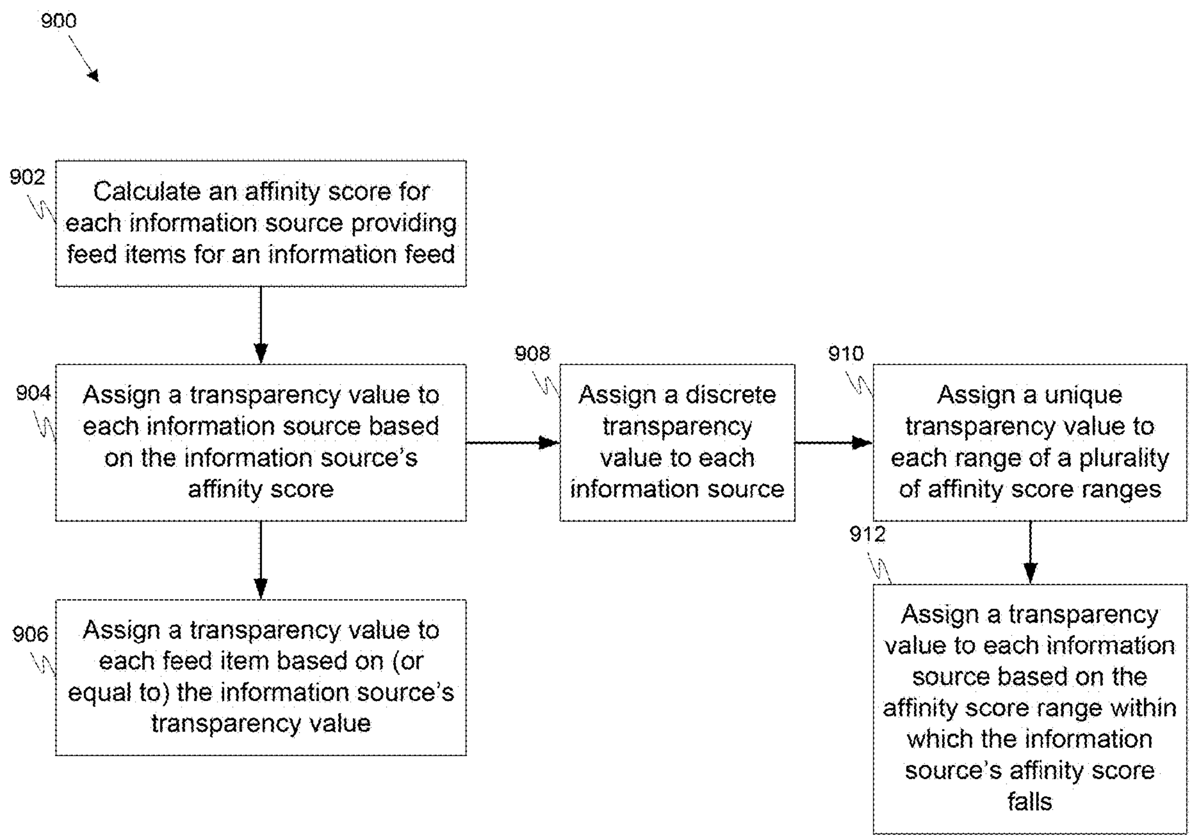
FIG. 9 is a process flow chart depicting another example process for assigning different transparency values to feed items.

FIG. 9 is a process flow chart depicting another example process 900 for assigning different transparency values to feed items. This example includes operations similar to the operations of example process 400. The social networking system calculates an affinity score for a number of information sources including the information sources that will provide feed items for a user's information feed (operation 902). The social networking system assigns a transparency value to each information source based on the information source's affinity score (operation 904). The social networking system assigns a transparency value to each feed item based on (or equal to) the information source's transparency value (operation 906). Also, a discrete transparency value is assigned to an information source (operation 908).

This example process 900 provides example operations for assigning a discrete transparency value to an information source. A unique, discrete transparency value is assigned to each range of a plurality of affinity score ranges (operation 910). A transparency value is assigned to each information source based on the affinity score range within which the information source's affinity score falls (operation 912).

Figure 10:
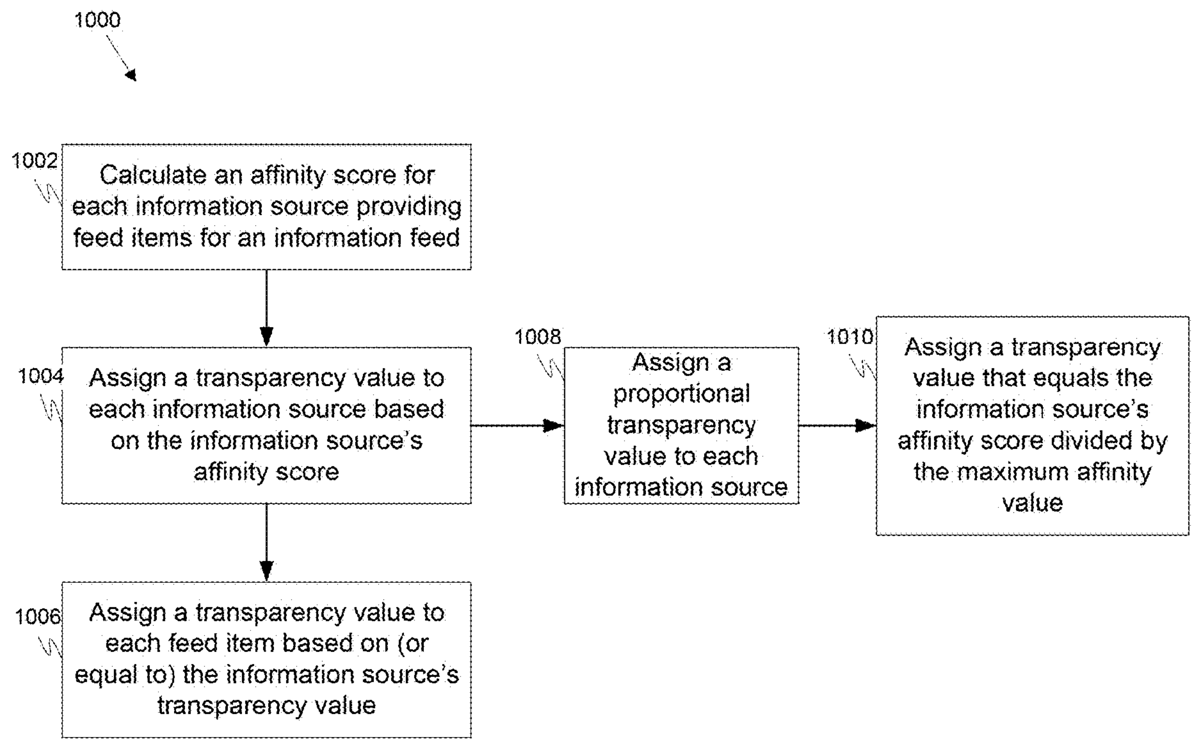
FIG. 10 is a process flow chart depicting another example process for assigning different transparency values to feed items.

FIG. 10 is a process flow chart depicting another example process 1000 for assigning different transparency values to feed items. This example includes operations similar to the operations of example process 400. The social networking system calculates an affinity score for a number of information sources including the information sources that will provide feed items for a user's information feed (operation 1002). The social networking system assigns a transparency value to each information source based on the information source's affinity score (operation 1004). The social networking system assigns a transparency value to each feed item based on (or equal to) the information source's transparency value (operation 1006). Also, a proportional transparency value is assigned to each information source (operation 1008).

This example process 1000 provides example operations for assigning a proportional transparency value to an information source. In this example, a transparency value is assigned that equals the information source's affinity score divided by the maximum affinity score (operation 1010). In another example, a transparency value may be assigned that equals the information source's affinity score divided by some other value.

Figure 11:
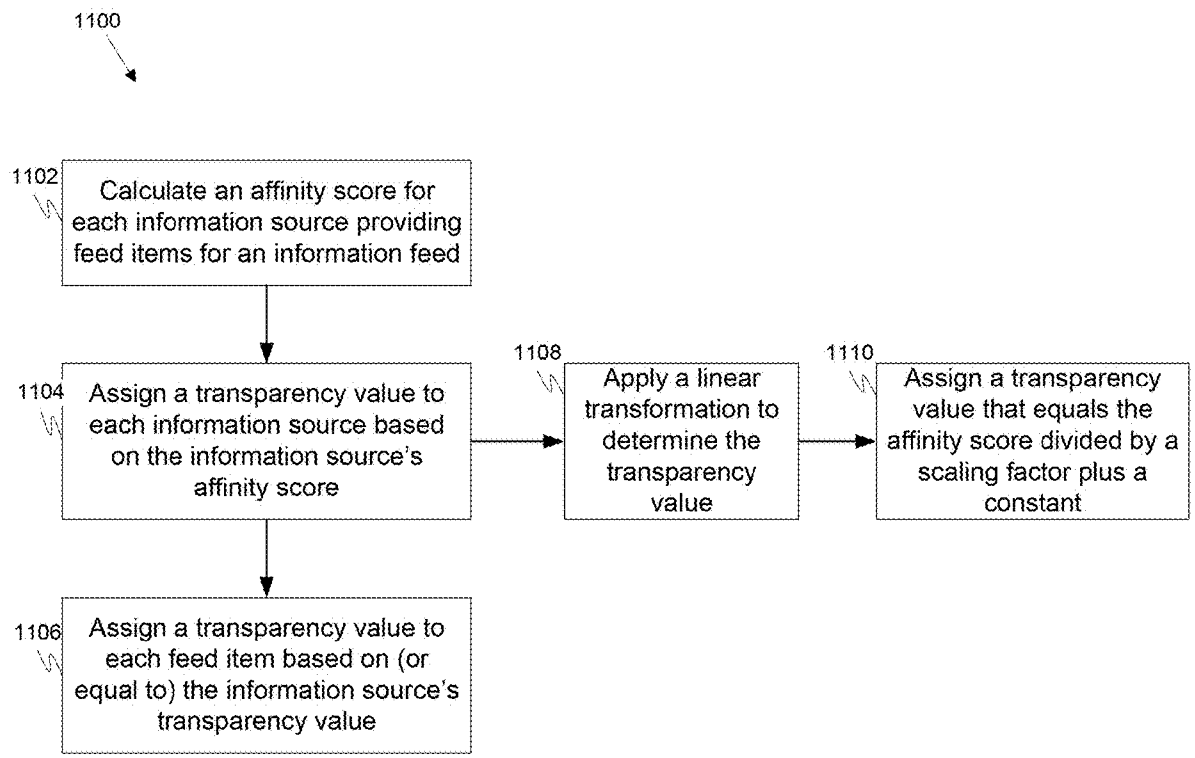
FIG. 11 is a process flow chart depicting another example process for assigning different transparency values to feed items.

FIG. 11 is a process flow chart depicting another example process 1100 for assigning different transparency values to feed items. This example includes operations similar to the operations of example process 400. The social networking system calculates an affinity score for a number of information sources including the information sources that will provide feed items for a user's information feed (operation 1102). The social networking system assigns a transparency value to each information source based on the information source's affinity score (operation 1104). The social networking system assigns a transparency value to each feed item based on (or equal to) the information source's transparency value (operation 1106). Also, a linear transformation is applied to determine the transparency value assigned to each information source (operation 1108).

This example process 1100 provides example operations for applying a linear transformation to the affinity scores when assigning a transparency value to an information source. In this example, a transparency value is assigned that equals the information source's affinity score divided by a scaling factor plus a constant (operation 1110). The scaling factor and constant may be different in different examples.

Figure 12:
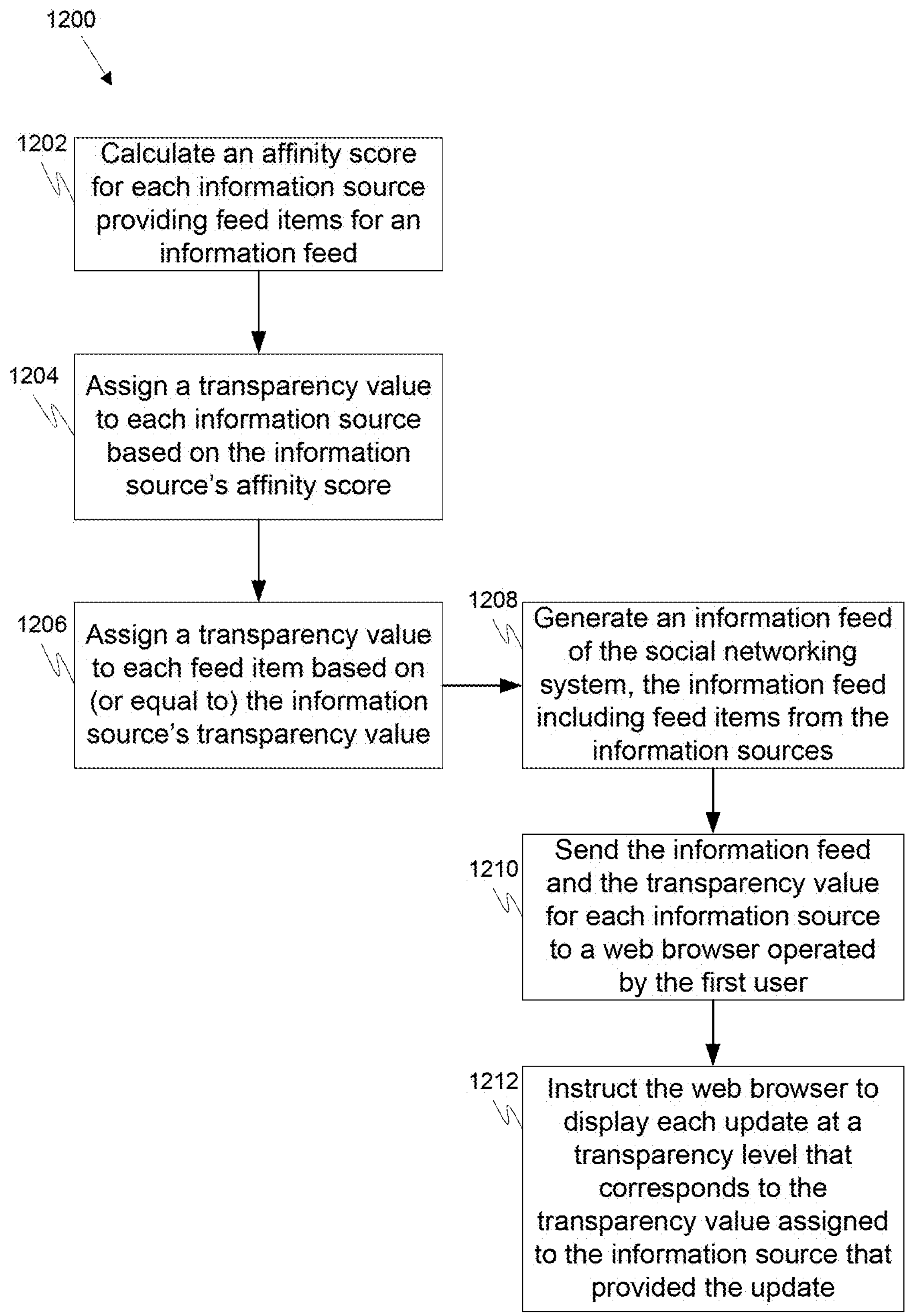
FIG. 12 is a process flow chart depicting another example process for assigning different transparency values to feed items.

FIG. 12 is a process flow chart depicting another example process 1200 for assigning different transparency values to feed items. This example includes operations similar to the operations of example process 400. The social networking system calculates an affinity score for a number of information sources including the information sources that will provide feed items for a user's information feed (operation 1202). The social networking system assigns a transparency value to each information source based on the information source's affinity score (operation 1204). The social networking system assigns a transparency value to each feed item based on (or equal to) the information source's transparency value (operation 1206).

This example process 1200 provides example operations for assigning a transparency value to each feed item based on the information source's transparency value. This example includes generating an information feed of the social networking system wherein the information feed includes feed items from the information sources (operation 1208); sending the information feed and the transparency value for each information source to a web browser operated by the first user (operation 1210); and instructing the web browser to display each update at a transparency level that corresponds to the transparency value assigned to the information source that provided the update (operation 1212).

Figure 13:
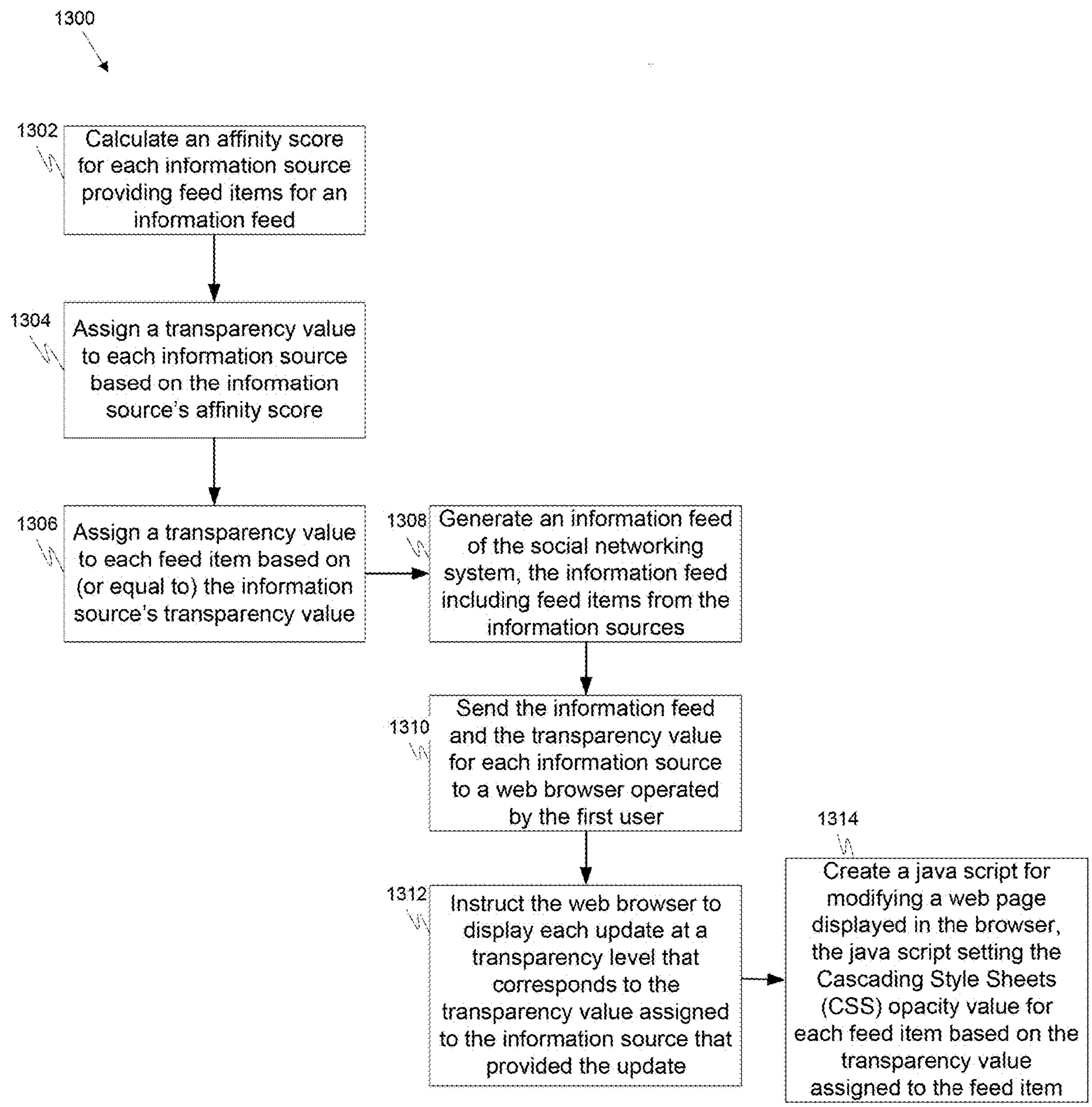
FIG. 13 is a process flow chart depicting another example process for assigning different transparency values to feed items.

FIG. 13 is a process flow chart depicting another example process 1300 for assigning different transparency values to feed items. This example includes operations similar to the operations of example process 1200. The social networking system calculates an affinity score for a number of information sources including the information sources that will provide feed items for a user's information feed (operation 1302). The social networking system assigns a transparency value to each information source based on the information source's affinity score (operation 1304). The social networking system assigns a transparency value to each feed item based on (or equal to) the information source's transparency value (operation 1306). Example operations for assigning a transparency value to each feed item based on the information source's transparency value include generating an information feed of the social networking system wherein the information feed includes feed items from the information sources (operation 1308); sending the information feed and the transparency value for each information source to a web browser operated by the first user (operation 1310); and instructing the web browser to display each update at a transparency level that corresponds to the transparency value assigned to the information source that provided the update (operation 1312).

This example process 1300 provides example operations for instructing the web browser to display each update at a transparency level that corresponds to the transparency value assigned to the information source that provided the update. In this example, the social networking system creates a java script for modifying a web page displayed in the browser wherein the java script sets the cascading style sheets (CSS) opacity value for each feed item based on the transparency value assigned to the feed item (operation 1314).

Figure 14:
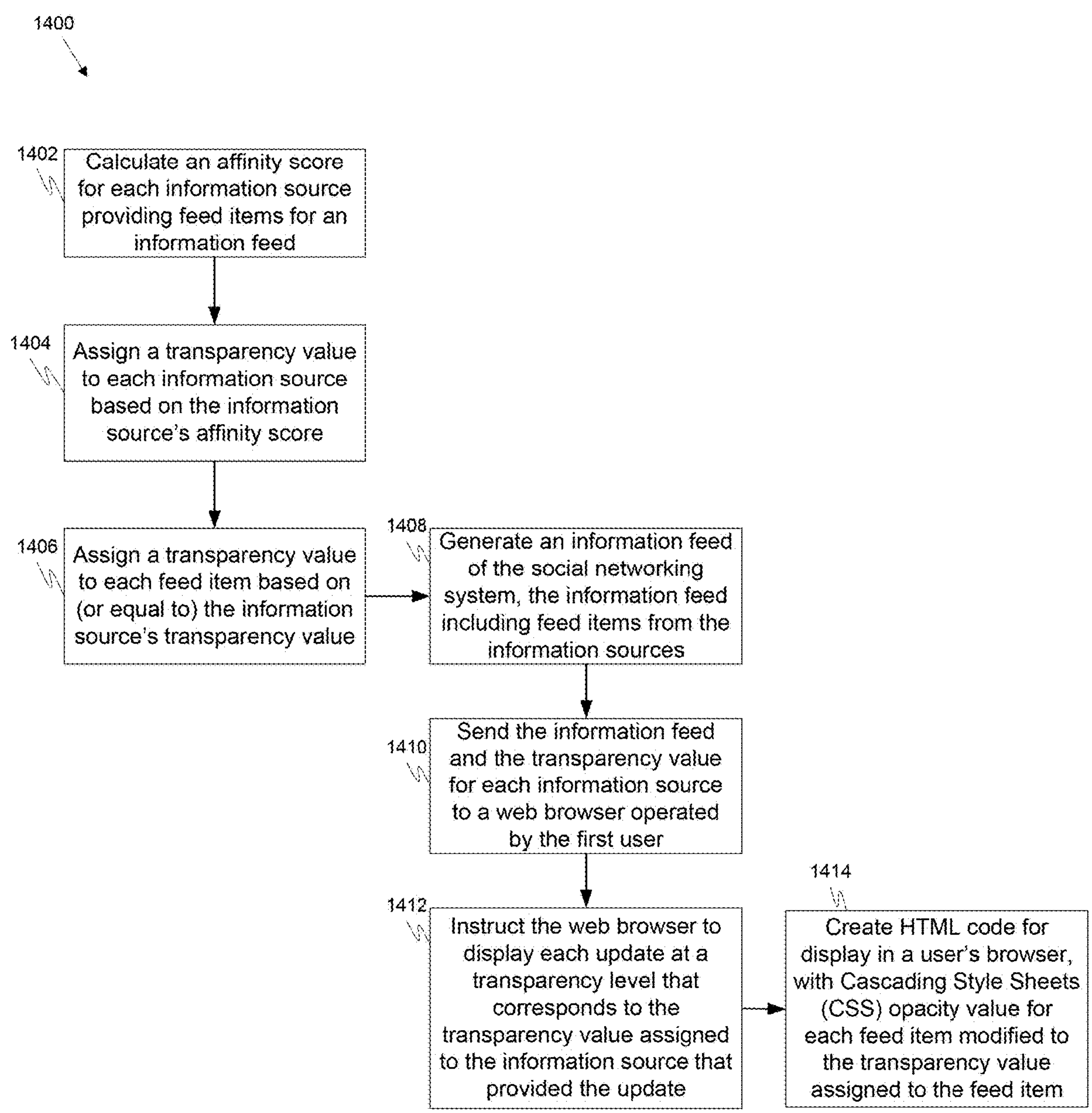
FIG. 14 is a process flow chart depicting another example process for assigning different transparency values to feed items.

FIG. 14 is a process flow chart depicting another example process 1400 for assigning different transparency values to feed items. This example includes operations similar to the operations of example process 1200. The social networking system calculates an affinity score for a number of information sources including the information sources that will provide feed items for a user's information feed (operation 1402). The social networking system assigns a transparency value to each information source based on the information source's affinity score (operation 1404). The social networking system assigns a transparency value to each feed item based on (or equal to) the information source's transparency value (operation 1406). Example operations for assigning a transparency value to each feed item based on the information source's transparency value include generating an information feed of the social networking system wherein the information feed includes feed items from the information sources (operation 1408); sending the information feed and the transparency value for each information source to a web browser operated by the first user (operation 1410); and instructing the web browser to display each update at a transparency level that corresponds to the transparency value assigned to the information source that provided the update (operation 1412).

This example process 1400 provides example operations for instructing the web browser to display each update at a transparency level that corresponds to the transparency value assigned to the information source that provided the update. In this example, the social networking system creates HTML code for display in a user's browser with the cascading style sheets (CSS) opacity value for each feed item modified to the transparency value assigned to the feed item (operation 1414).

Disclosed herein are systems and methods for customizing a user's information feed to focus the information feed to feed items that may be more relevant to the user. The apparatus, systems, techniques and articles described herein allow feed items from a user's information feed in a user interface to be displayed at different transparency levels to allow certain feeds to be more pronounced. An affinity score can be calculated and used as a basis for determining the transparency value of feed items.

In one embodiment, a method of providing feed information from a database system associated with a social networking system is provided. The method comprises calculating, using the database system, for a plurality of information sources that provide updates to an information feed for a first user of a social networking system, an affinity score for each information source wherein the affinity score for each information source calculated based on interaction factors between the first user and the information source. The method further comprises converting, using the database system, each affinity score to a transparency value, assigning to each information source, by the database system, the transparency value that was converted from the affinity score calculated for the information source, and generating, using the database system, the information feed of the social networking system for the first user wherein the information feed includes updates from the information sources. The method further comprises sending to a web browser operated by the first user, by a database server in the database system, the information feed and the transparency value assigned to each information source, and instructing, by the database server, the web browser to display each update at a transparency level that corresponds to the transparency value assigned to the information source that provided the update.

These aspects and other embodiments may include one or more of the following features. An information source may comprise a second user, a user group, or a record. The transparency value may correspond to a cascading style sheets (CSS) opacity attribute. Instructing the web browser may comprise instructing the web browser to run a java script that adjusts the cascading style sheets (CSS) opacity attribute of each update based on the assigned transparency value. Instructing the web browser may comprise creating HTML code for display in a user's browser with the cascading style sheets (CSS) opacity attribute of each update modified to the transparency value assigned to the feed item. The interaction factors may include one or more of the number of interactions, the type of interactions, the frequency of interactions and the recentness of interactions between the first user and the information source. Assigning the transparency value may comprise assigning a transparency value that is proportional to the affinity score. Assigning the transparency value may comprise assigning a discrete transparency value to the information source. Assigning the transparency value may comprise applying a linear transformation to determine the transparency value.

In another embodiment, a database system is provided. The database system comprises one or more processors and non-transient computer readable media encoded with programming instructions causing the one or more processors to implement a method. The method comprises calculating, for a plurality of information sources that provide updates to an information feed for a first user of a social networking system, an affinity score for each information source wherein the affinity score for each information source is calculated based on interaction factors between the first user and the information source. The method further comprises converting each affinity score to a transparency value, assigning to each information source the transparency value that was converted from the affinity score calculated for the information source, and generating the information feed of the social networking system for the first user wherein the information feed includes updates from the information sources. The method further comprises sending the information feed and the transparency value assigned to each information source to a web browser operated by the first user and instructing the web browser to display each update at a transparency level that corresponds to the transparency value assigned to the information source that provided the update.

These aspects and other embodiments may include one or more of the following features. An information source may comprise a second user, a user group, or a record. The transparency value may correspond to a cascading style sheets (CSS) opacity attribute. Instructing the web browser may comprise instructing the web browser to run a java script that adjusts the cascading style sheets (CSS) opacity attribute of each update based on the assigned transparency value. Instructing the web browser may comprise creating HTML code for display in a user's browser with the cascading style sheets (CSS) opacity attribute of each update modified to the transparency value assigned to the feed item. The interaction factors may include one or more of the number of interactions, the type of interactions, the frequency of interactions and the recentness of interactions between the first user and the information source. Assigning a transparency value may comprise assigning a transparency value that is proportional to the affinity score. Assigning a transparency value may comprise assigning a discrete transparency value to the information source. Assigning a transparency value may comprise applying a linear transformation to determine the transparency value.

In another embodiment, non-transient computer readable media encoded with computer instructions causing a computer to implement a method are provided. The method comprises, calculating, using a database system, for a plurality of information sources that provide updates to an information feed for a first user of a social networking system, an affinity score for each information source wherein the affinity score for each information source is calculated based on interaction factors between the first user and the information source. The method further comprises converting, using the database system, each affinity score to a transparency value, assigning to each information source, using the database system, the transparency value that was converted from the affinity score calculated for the information source, and generating, using the database system, the information feed of the social networking system for the first user wherein the information feed includes updates from the information sources. The method further comprises sending, by a database server in the database system to a web browser operated by the first user, the information feed and the transparency value assigned to each information source, and instructing, by the database server, the web browser to display each update at a transparency level that corresponds to the transparency value assigned to the information source that provided the update.

These aspects and other embodiments may include one or more of the following features. An information source may comprise a second user, a user group, or a record. The transparency value may correspond to a cascading style sheets (CSS) opacity attribute. Instructing the web browser may comprise instructing the web browser to run a java script that adjusts the cascading style sheets (CSS) opacity attribute of each update based on the assigned transparency value. Assigning the transparency value may comprise applying a linear transformation to determine the transparency value.

The foregoing description is merely illustrative in nature and is not intended to limit the embodiments of the subject matter or the application and uses of such embodiments. Furthermore, there is no intention to be bound by any expressed or implied theory presented in the technical field, background, or the detailed description. As used herein, the word "exemplary" means "serving as an example, instance, or illustration." Any implementation described herein as exemplary is not necessarily to be construed as preferred or advantageous over other implementations, and the exemplary embodiments described herein are not intended to limit the scope or applicability of the subject matter in any way.

For the sake of brevity, conventional techniques related to object models, web pages, multi-tenancy, cloud computing, on-demand applications, and other functional aspects of the systems (and the individual operating components of the systems) may not be described in detail herein. In addition, those skilled in the art will appreciate that embodiments may be practiced in conjunction with any number of system and/or network architectures, data transmission protocols, and device configurations, and that the system described herein is merely one suitable example. Furthermore, certain terminology may be used herein for the purpose of reference only, and thus is not intended to be limiting. For example, the terms "first," "second" and other such numerical terms do not imply a sequence or order unless clearly indicated by the context.

Embodiments of the subject matter may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processing systems or devices can carry out the described operations, tasks, and functions by manipulating electrical signals representing data bits at accessible memory locations, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The "processor-readable medium" or "machine-readable medium" may include any non-transitory medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like. In this regard, the subject matter described herein can be implemented in the context of any computer-implemented system and/or in connection with two or more separate and distinct computer-implemented systems that cooperate and communicate with one another. In one or more exemplary embodiments, the subject matter described herein is implemented in conjunction with a virtual customer relationship management (CRM) application in a multi-tenant environment.

While at least one exemplary embodiment has been presented, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application. Accordingly, details of the exemplary embodiments or other limitations described above should not be read into the claims absent a clear intention to the contrary.

What is claimed is:

1. A method of providing feed information from a database system associated with a social networking system, the method comprising:

calculating, using the database system, an affinity score for a plurality of information sources providing feed items for an information feed, the affinity score for an information source calculated based on interaction factors with the information source;

assigning, by the database system, a transparency value to the plurality of information sources based on the affinity score calculated for the information source;

assigning, by the database system, a transparency value to feed items from the plurality of information sources based on the transparency value assigned to the information source that provided the feed item;

causing, by the database system, a plurality of the feed items to be displayed in the information feed at different transparency values.

2. The method of claim 1, wherein the transparency value corresponds to a cascading style sheets (CSS) opacity attribute.

3. The method of claim 1, wherein the causing a plurality of the feed items to be displayed in the information feed at different transparency values comprises instructing a web browser to run a java script that adjusts the cascading style sheets (CSS) opacity attribute of the plurality of the feed items based on the assigned transparency value.

4. The method of claim 1, wherein the causing a plurality of the feed items to be displayed in the information feed at different transparency values comprises creating HTML code for display in a user's browser with the cascading style sheets (CSS) opacity attribute of the plurality of the feed items modified to the transparency value assigned to the feed item.

5. The method of claim 1, wherein the interaction factors include one or more of the number of interactions, the type of interactions, the frequency of interactions and the recentness of interactions between the first user and the information source.

6. The method of claim 1, wherein the assigning a transparency value based on the affinity score comprises assigning a transparency value that is proportional to the affinity score.

7. The method of claim 1, wherein the assigning a transparency value based on the affinity score comprises assigning a discrete transparency value to the information source.

8. The method of claim 1, wherein the assigning a transparency value based on the affinity score comprises applying a linear transformation to determine the transparency value.

9. A database system comprising:

one or more processors;

non-transient computer readable media encoded with programming instructions causing the one or more processors to implement a method comprising:

calculating, using the database system, an affinity score for a plurality of information sources providing feed items for an information feed, the affinity score for an information source calculated based on interaction factors with the information source;

assigning, by the database system, a transparency value to the plurality of information sources based on the affinity score calculated for the information source;

assigning, by the database system, a transparency value to feed items from the plurality of information sources based on the transparency value assigned to the information source that provided the feed item;

causing, by the database system, a plurality of the feed items to be displayed in the information feed at different transparency values.

10. The database system of claim 9, wherein the transparency value corresponds to a cascading style sheets (CSS) opacity attribute.

11. The database system of claim 9, wherein the causing a plurality of the feed items to be displayed in the information feed at different transparency values comprises instructing a web browser to run a java script that adjusts the cascading style sheets (CSS) opacity attribute of the plurality of the feed items based on the assigned transparency value.

12. The database system of claim 9, wherein the causing a plurality of the feed items to be displayed in the information feed at different transparency values comprises creating HTML code for display in a user's browser with the cascading style sheets (CSS) opacity attribute of the plurality of the feed items modified to the transparency value assigned to the feed item.

13. The database system of claim 9, wherein the interaction factors include one or more of the number of interactions, the type of interactions, the frequency of interactions and the recentness of interactions between the first user and the information source.

14. The database system of claim 9, wherein the assigning a transparency value based on the affinity score comprises assigning a transparency value that is proportional to the affinity score.

15. The database system of claim 9, wherein the assigning a transparency value based on the affinity score comprises assigning a discrete transparency value to the information source.

16. The database system of claim 9, wherein the assigning a transparency value based on the affinity score comprises applying a linear transformation to determine the transparency value.

17. A non-transient computer readable medium embodying programming instructions configurable to perform a method, the method comprising:

calculating, using a database system, an affinity score for a plurality of information sources providing feed items for an information feed, the affinity score for an information source calculated based on interaction factors with the information source;

assigning, by the database system, a transparency value to the plurality of information sources based on the affinity score calculated for the information source;

assigning, by the database system, a transparency value to feed items from the plurality of information sources based on the transparency value assigned to the information source that provided the feed item;

causing, by the database system, a plurality of the feed items to be displayed in the information feed at different transparency values.

18. The non-transient computer readable medium of claim 17, wherein the transparency value corresponds to a cascading style sheets (CSS) opacity attribute.

19. The non-transient computer readable medium of claim 17, wherein the causing a plurality of the feed items to be displayed in the information feed at different transparency values comprises instructing a web browser to run a java script that adjusts the cascading style sheets (CSS) opacity attribute of the plurality of the feed items based on the assigned transparency value.

20. The non-transient computer readable medium of claim 17, wherein the assigning a transparency value based on the affinity score comprises applying a linear transformation to determine the transparency value.

* * * * *